Figure 3:
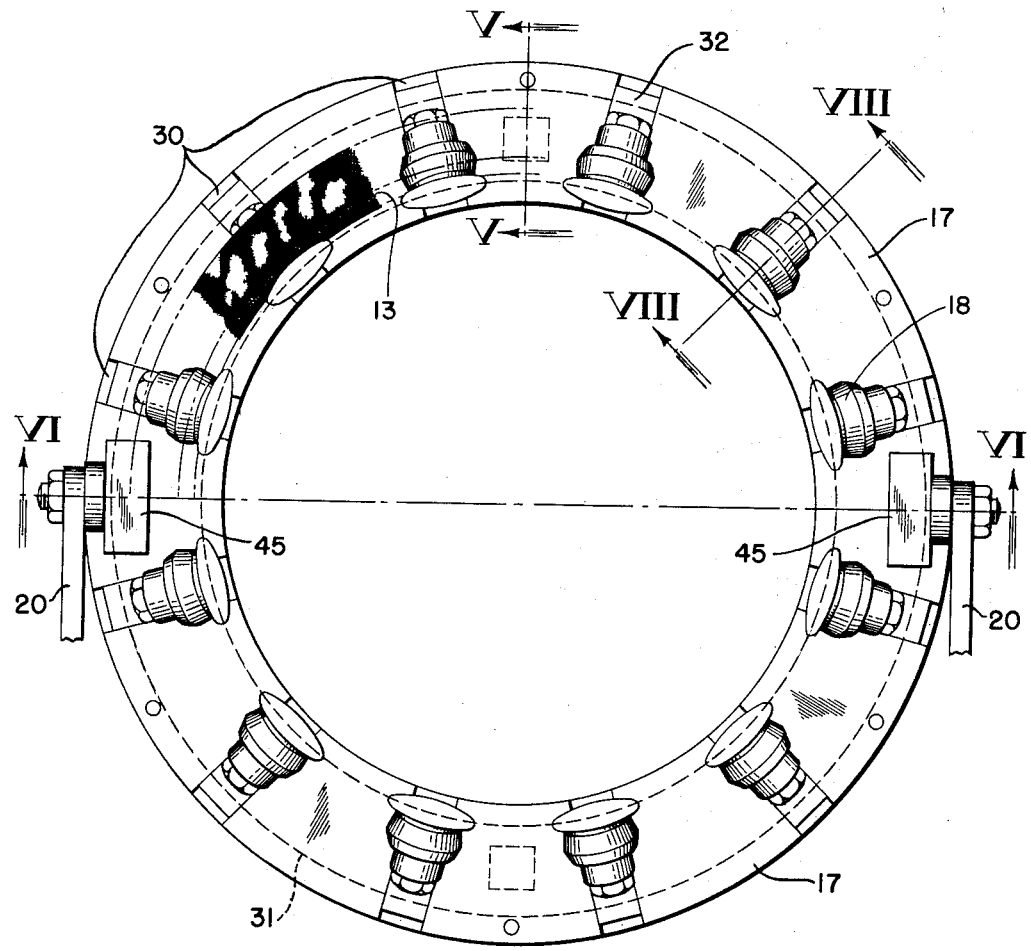

Jan. 5, 1954
A. C. HIRSCH ET AL
2,664,937
TIRE BEAD SETTING APPARATUS
Filed Aug. 1, 1951
3 Sheets-Sheet 1
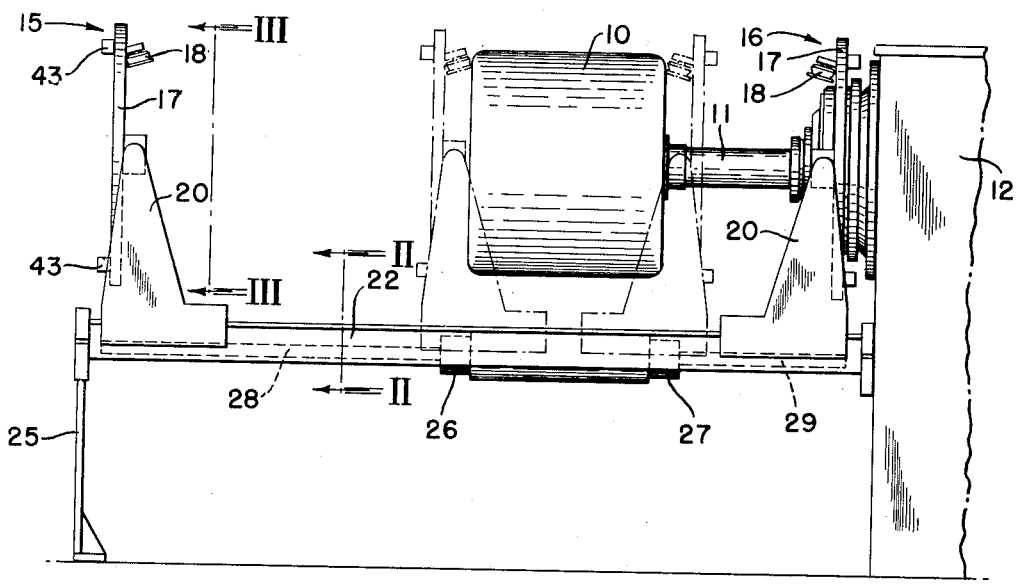
Fig. 1
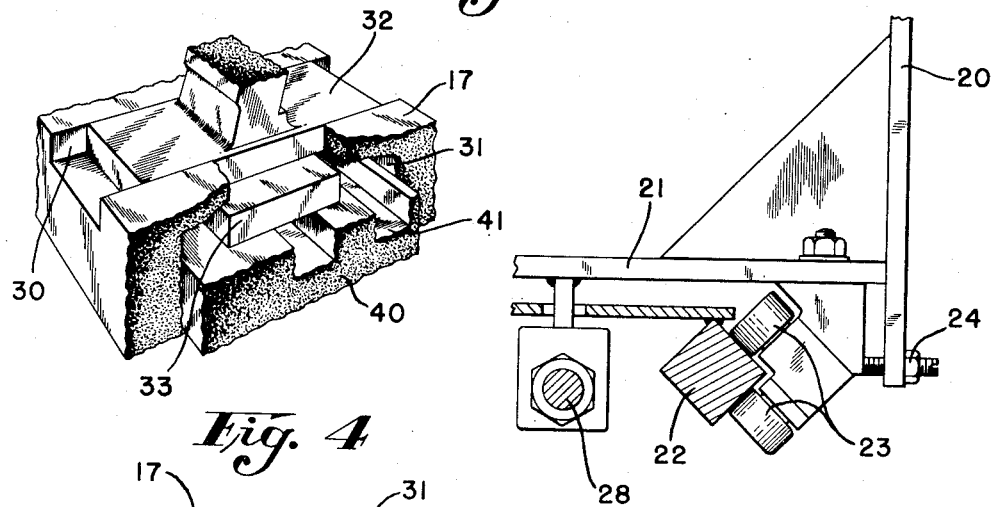
Fig. 4
Fig. 2
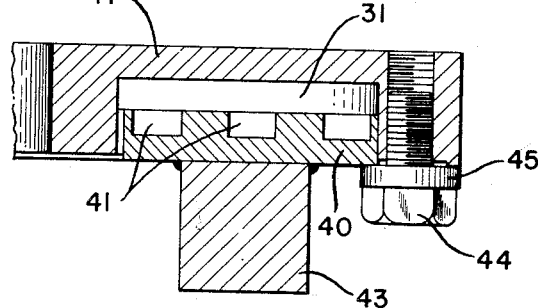
Fig. 5
INVENTOR.
ALF C. HIRSCH
GEORGE F. WIKLE
BY
Irwin M. Lewis
ATTORNEY.

Jan. 5, 1954   A. C. HIRSCH ET AL   2,664,937
TIRE BEAD SETTING APPARATUS
Filed Aug. 1, 1951   3 Sheets-Sheet 2

INVENTOR.
ALF C. HIRSCH
BY GEORGE F. WIKLE

ATTORNEY.

INVENTOR.
ALF C. HIRSCH
GEORGE F. WIKLE
BY
ATTORNEY.

Patented Jan. 5, 1954

2,664,937

UNITED STATES PATENT OFFICE 2,664,937

TIRE BEAD SETTING APPARATUS

Alf C. Hirsch, Eau Claire, Wis., and George Frederick Wikle, Detroit, Mich., assignors to United States Rubber Company, New York, N. Y., a corporation of New Jersey Application August 1, 1951, Serial No. 239,805

12 Claims. (Cl. 154—10)

This invention relates to bead setting apparatus for applying tire bead rings in the fabrication of tires on a tire building drum.

Heretofore tire bead ring setters have been in the form of rings or annular members which would support the bead ring and when moved inwardly toward the ends of the tire building drum would apply the bead ring and rotate with the building drum. Because there was no relative movement between the bead setter and the bead, if the bead was not parallel with the end of the building drum, the bead would be pressed against the drum at only one point and would not properly adhere to the tire fabric on the drum, so that when the bead setting ring was retracted, it would fall away from the drum. In addition, if the bead ring setter was slightly out of axial alignment with the building drum it would still set the bead ring, but the ring would be eccentric to the axis of the drum.

It is one object, therefore of the present invention to provide a tire bead setting apparatus which will firmly adhere the tire bead to the tire fabric of the drum even though the bead setter is initially out of parallel with the end of the drum.

It is another object of the invention to provide a bead setting apparatus which will not set the bead unless the bead is concentric with the axis of the drum.

It is another object of the invention to provide a bead setting apparatus which will stitch the bead ring to the tire fabric on the building drum.

A still further object of the invention is to provide a bead setting apparatus which is adjustable to accommodate bead rings of various diameters.

According to the present invention, the bead setter is in the form of a plurality of stitching rollers mounted in a circular pattern on a supporting frame, rather than in the form of a continuous ring or annular member. The frame is statioanry so that the rollers cannot rotate as a group. The rollers as a group support the bead ring and when the frame is moved toward the end of the tire building drum, the bead is applied to the tire fabric on the drum. When the bead ring contacts the fabric on the drum it rotates with the drum, but the rollers and frame remain stationary. As the bead rotates, the individual rollers are rotated thereby and firmly stitch the bead ring to the tire fabric on the drum.

If the rollers as a group are not parallel with the end of the drum, at least one of the rollers will press the bead ring against the end of the drum and as the bead ring rotates with the drum relative to the rollers it will be stitched completely around its circumference.

If the rollers as a group are not in axial alignment with the axis of rotation of the drum, the bead ring will not be stitched as it will be pulled loose from the drum by the rollers as it is rotated relative to the rollers. For this reason, the bead ring setter of the present invention will set the bead ring accurately or not at all.

By using rollers, the stitching pressure, because of the substantially line contact between the rollers and the bead, is considerably higher than is the case in the use of a continuous ring or annular member where the pressure must be distributed over a much larger area.

Figure 6:
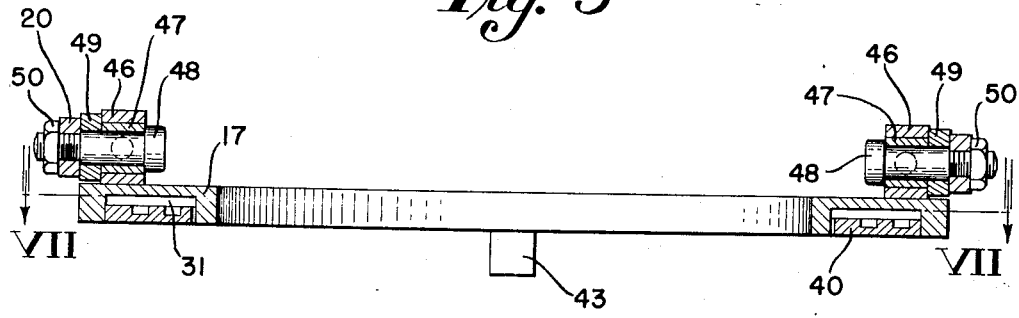
Figure 7:
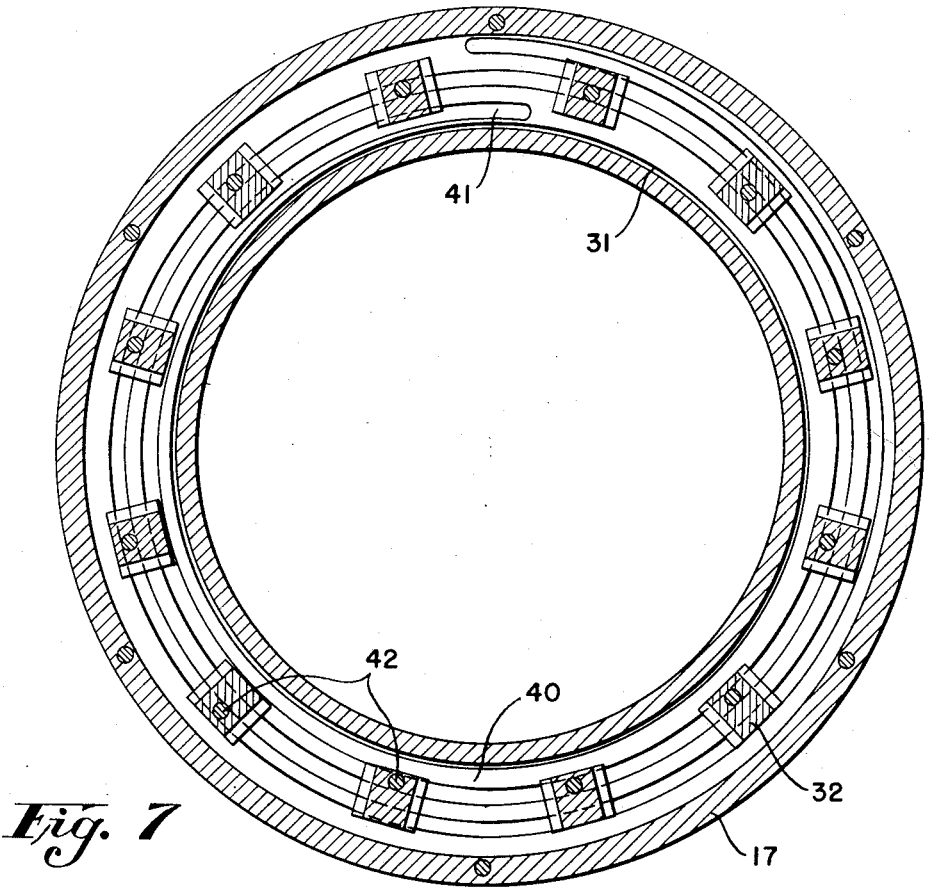
Figure 8:
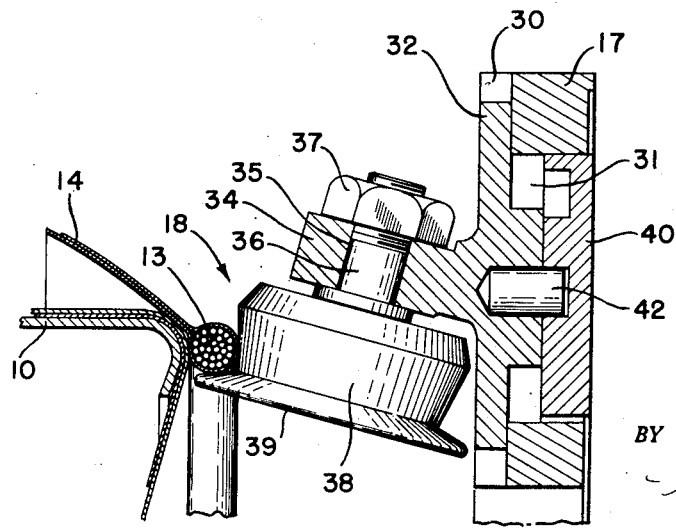

Other objects and advantages of the present invention will become apparent from the following description when read in conjunction with the accompanying drawings, wherein:

Fig. 1 is an elevational view showing the tire bead setting apparatus of the present invention as applied to a conventional tire building drum, Fig. 2 is a partial sectional view taken on the line II—II of Fig. 1 showing the details of the bearing roller and way construction for slidably mounting the bead setting apparatus for movement towards and away from the ends of the tire building drum, Fig. 3 is an elevational view of the bead setting apparatus taken in the direction of the arrows of the line III—III of Fig. 1, Fig. 4 is an isometric view partially in section of a portion of the bead setting apparatus showing details of the roller supporting block and the cam plate for moving the roller supporting blocks, Fig. 5 is an enlarged sectional view taken on the line V—V of Fig. 3 showing the clamping screw for locking the cam plate, Fig. 6 is a sectional view taken on the line VI—VI of Fig. 3 showing the details of the pivotal connection between the roller frame and the supporting bracket, Fig. 7 is a sectional view taken on the line VII—VII of Fig. 6 showing the spiral cam groove in the cam plate, and Fig. 8 is an enlarged sectional view taken on the line VIII—VIII of Fig. 3 showing the engagement of one of the bead supporting and stitching rollers with the tire bead in applying it to the fabric on the tire building drum.

Referring to the drawings and in particular to Fig. 1 of the drawings, there is shown a conventional tire building drum 10 supported and driven by a shaft 11. Shaft 11 in turn is driven by a power source 12.

In fabricating a tire, plies of fabric are wound on the drum 10 as it is rotated. After a predetermined number of plies have been wound on the drum, a wire bead ring 13 and flipper strips 14 are applied to the fabric on the drum at each end of the drum as shown in Fig. 8 and then additional plies of fabric are applied to the drum.

The apparatus of the present invention for applying the bead rings includes two bead setting rings 15 and 16 positioned at each end of the building drum 10. Each of the rings 15 and 16 are identical and include a circular frame 17 and a plurality of spaced bead ring supporting and stitching rollers 18 mounted in a circular pattern around the frame as shown in Fig. 3.

The frame 17 is pivotally mounted between a pair of brackets which in turn are secured to a base plate 21 as shown in Fig. 2. Base plate 21 is mounted for linear movement along a pair of parallel ways 22 by means of roller bearings 23. Adjustment of the roller bearings 23 is provided by means of adjusting screws 24 threaded in the lower side of the bracket 20. Ways 22 extend parallel to the axis of the building drum 10 slightly below the drum and are fastened at one end to the power source 12 and are supported at the other end by legs 25.

The bead setting rings 15 and 16 are moved towards the ends of the drum 10 to apply a tire bead ring by means of air cylinders 26 and 27, secured between the ways 22. The piston rod 28 of air cylinder 26 is connected to the bottom of the base plate 21 of the bead setting ring 15 and the piston rod 29 of the air cylinder 27 is connected to the bottom of the base plate of the bead setting ring 16. The bead setting rings 15 and 16 are shown in their retracted position in solid lines in Fig. 1 and in their bead applying position by dotted lines.

The roller supporting frame 17 as shown in Fig. 3 is in the form of a ring shaped plate. A plurality of equally spaced radially extending slots 30 are formed in one face of the frame 17 as best shown in Figs. 3 and 4. Each of the slots 30 communicate with a circular slot 31 formed in the opposite face of the frame 17. A roller supporting block 32 is slidably mounted in each of the slots 30 and is retained in the slot by means of a flange or lip 33 (Fig. 4) formed on the bottom portion of the block and which extends into the circular slot 31. The width of the lip 33 is considerably less than the width of the slot 31 to allow the roller supporting block 32 to be adjusted radially along the slots 30.

Each of the blocks 32 has an integral portion 34 which extends at an angle from the face of the block. The portion 34 has a hole 35 provided therein to receive the end of a bearing shaft 36 for the tire bead supporting and stitching roller 18. The end of the shaft 36 is threaded and receives a nut 37 so that the shaft 36 may be secured to the portion 34.

The roller 18 is rotatably mounted on the opposite end of the bearing shaft 36. The axes of the rollers 18 extends radially inwardly and if extended would meet at a common point. The axis of the roller is also set at a slight angle to the face of the frame 17.

The roller 18 has a tapered portion 38 and a tapered flange portion 39 as seen in Fig. 8. The angle of the axis of the roller is set so that the tapered flange surface 39 at the point that it engages the bead ring is substantially perpendicular to the face of the frame 17 and the tapered surface 38 at the point that it engages the bead ring is substantially parallel with the face of the frame 17. The flanges 39 of the rollers 18 as a group support the bead ring and the tapered portion 38 applies a stitching force to the bead ring 13 to stitch it to the tire fabric on the drum 10. The angular position of the axis of the roller 18 is provided so that the bead ring 13 will have essentially line contact with the flange 39 and sufficient clearance will thereby be provided on each side of the line of contact to prevent the flange 39 from biting into the bead ring.

Each of the roller supporting blocks 32 may be simultaneously radially adjusted by rotating a cam plate 40 (Figs. 4, 5, 7 and 8). Cam plate 40 is in the form of a ring which fits into and slides around the circular slot 31. The cam plate 40 has a spiral shaped cam groove 41 formed therein which is engaged by a cam follower in the form of a pin 42, carried by each of the roller supporting blocks 32. When the cam plate is rotated, it moves the roller supporting blocks 32, and therefore the roller 18 carried thereby, radially along the slots 30. In this manner the position of the rollers may be adjusted radially to accommodate bead rings of various diameters.

To assist in turning the cam plate 40, lugs 43 (Figs. 1 and 5) are secured to the outer surface of the plate which may be grasped or tapped with a hammer to rotate the plate. To retain the cam plate 40 in the circular slot 31, and also to hold the plate in any particular adjusted position, a plurality of clamping screws 44 (Fig. 5) are provided, which are threaded into the back face of the frame 17 adjacent the outer periphery thereof. Washers 45 are provided under the head of the clamping screws 44 which engage the cam plate 40. When the clamping screws are tightened, the cam plate 40 will, therefore, be locked in an adjusted position.

As previously described the frame 17 is pivotally mounted between the brackets 20. The pivotal mounting as shown in Fig. 6 includes a pair of bearing blocks 46 secured at diametrically opposite points adjacent the periphery of the frame 17. The blocks 46 are provided with bushing bearings 47 through which shouldered bolts 48 pass. The bolts 48 are provided with spacing washers 49 and the bolts extend through holes provided in the brackets 20. The ends of the bolts are threaded and receive a retaining nut 50. By this construction, frame 17 is free to rotate about the bolts 48, the axes of which lie on the diameter of the circular pattern of the rollers 18. The purpose of this structure is to provide a self aligning feature. When the bead setting rings 15 and 16 are moved against the ends of the drum 10, if they are not parallel therewith, they will align themselves when they engage the drum by reason of their pivotal mountings. It is to be noted that the frames 17 are restrained against any rotation about an axis passing through the drum 10 and that, therefore, when the frame is brought against the end of the drum, the individual rollers will rotate but the frame will not.

In using the present invention, the position of the rollers 18 are adjusted to accommodate a particular size bead ring by turning cam plate 40. The cam plate is then locked by tightening clamping bolts 44. A bead ring 13 is placed on the rollers 18 as shown in Figs. 3 and 8; the bead ring being supported by the flanges 39. The bead ring carried by the rollers 18 is then moved towards the end of the building drum by one of the air cylinders 26 or 27. When the bead ring and flipper strips 14 engage the tire fabric carried by the rotating drum 10, they rotate with the drum. The frame 17 does not rotate, but the individual rollers 18 are rotated about their bearing shafts 36 by the rotating bead ring. As the rollers are drawn tightly against the ends of the building drum and are caused to rotate, they stitch the bead ring 13 securely to the tire fabric carried by the rotating drum 10 and when the bead setters 15 and 16 are retracted, the bead 13 remains secured to the fabric on the drum.

It is to be understood that the above description and accompanying drawing is for the purpose of illustration only and not by way of limitation and that changes in modifications may be made therein without departing from the spirit and scope of the invention.

Having thus described our invention, what we claim and desire to protect by Letters Patent is:

1. Tire bead setting apparatus comprising, a frame, a plurality of bead supporting and stitching rollers mounted in a circular pattern on said frame, and means mounting said frame for pivotal movement about a diameter of said circular pattern whereby the frame with the rollers mounted thereon may align itself with the end of a tire building drum when it is moved against the end of a tire building drum to apply the bead to a carcass carried by the drum.

2. Tire bead setting apparatus comprising, a frame, said frame having a plurality of radially extending slots formed therein, a roller supporting block slidably mounted in each slot, a bead supporting and stitching roller rotatably mounted on each of said supporting blocks, and means for simultaneously radially moving each of said blocks.

3. Tire bead setting apparatus comprising, a frame, said frame having a plurality of radially extending slots formed therein, a roller supporting block slidably mounted in each slot, a bead supporting and stitching roller rotatably mounted on each of said supporting blocks, and cam means for simultaneously radially moving each of said blocks.

4. Tire bead setting apparatus comprising, a frame, said frame having a plurality of radially extending slots formed therein, a roller supporting block slidably mounted in each slot, a bead supporting and stitching roller rotatably mounted on each of said supporting blocks, a cam follower on each block, and a cam rotatably mounted on said frame engaging said cam followers for radially moving said supporting blocks.

5. Tire bead setting apparatus comprising, a frame, said frame having a plurality of radially extending slots formed therein, a roller supporting block slidably mounted in each slot, a bead supporting and stitching roller rotatably mounted on each of said supporting blocks, a cam follower on each block, and a cam plate rotatably mounted on said frame, said cam plate having a spiral cam slot engageable with said cam followers for radially moving said supporting blocks.

6. In combination with a tire building drum, a pair of brackets slidably mounted opposite each end of said drum and movable towards and away from the ends of the drum, a frame pivotally mounted between each pair of brackets and a plurality of bead supporting and stitching rollers mounted in a circular pattern on said frame.

7. In combination with a tire building drum, a pair of brackets slidably mounted opposite each end of the drum and movable towards and away from the ends of the drum, a pair of frames, a plurality of bead supporting and stitching rollers mounted in a circular pattern on each of said frames, and means pivotally mounting each frame between one of said pair of brackets for angular adjustment around a diameter of said circular pattern.

8. In combination with a tire building drum, a pair of brackets slidably mounted opposite each end of the drum for movement towards and away from the ends of the drum, a pair of frames, a plurality of bead supporting and stitching rollers, means for adjustably mounting said rollers in spaced relationship in a circular pattern on each of said frames, and means pivotally mounting each frame between one of said pair of brackets for angular adjustment around a diameter of said circular pattern.

9. Tire bead setting apparatus comprising, a frame, said frame having a plurality of radially extending slots formed therein, a roller supporting block slidably mounted in each slot, a flanged bead supporting and stitching roller mounted on each block with the axis of the roller extending in the direction of the slot and means for simultaneously radially moving each of said blocks in said slots.

10. Tire bead setting apparatus comprising, a frame, said frame having a plurality of radially extending slots formed in one face thereof, a roller supporting block slidably mounted in each slot, a flanged bead supporting and stitching roller mounted on each block with the axis of the roller extending in the direction of the slot and at an angle to the plane of said face and means for simultaneously radially moving each of said blocks in said slots.

11. In combination with a tire building drum, a pair of brackets slidably mounted opposite each end of the drum for movement towards and away from each end of the drum, a frame pivotally mounted between each of said pair of brackets, each of said frames having a plurality of radially extending slots formed in one face thereof, a roller supporting block slidably mounted in each slot, a flanged bead supporting and stitching roller mounted on each block with the axis of the roller extending in the direction of the slot, and means for simultaneously radially moving each of said blocks in said slots.

12. Tire bead setting apparatus comprising, a frame, a plurality of rollers mounted in a circular pattern on said frame and extending outwardly from the face of the frame towards the center of said circular pattern, the surface of each roller being tapered toward the free end thereof and having an outwardly extending flange at the free end thereof providing a tapered surface perpendicular to the tapered surface of the roller, the angle that the axis of rotation of the rollers extend towards the center of the circular pattern being such that the point that the tapered surface of the roller engages the bead is substantially parallel with the face of the frame and the point that the tapered surface of the flange engages the bead is substantially perpendicular to the face of the frame whereby the tapered surface of the flange and the tapered surface of the roller makes substantially line contact with the bead and clearance is provided between the flange and the bead on either side of the line contact of the flange with the bead.

ALF C. HIRSCH.
GEORGE FREDERICK WIKLE.

References Cited in the file of this patent

UNITED STATES PATENTS

| Number | Name | Date |
| --- | --- | --- |
| 1,241,913 | Bradley | Oct. 2, 1917 |
| 1,657,846 | Stevens | Jan. 31, 1928 |
| 1,970,780 | Stevens | Aug. 21, 1934 |
| 2,034,642 | Stevens | Mar. 17, 1936 |
| 2,088,889 | Wikle | Aug. 3, 1937 |
| 2,339,551 | Stevens | Jan. 18, 1944 |